United States Patent
Annaka et al.

(10) Patent No.: US 11,710,821 B2
(45) Date of Patent: Jul. 25, 2023

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Tokyo (JP)

(72) Inventors: Koji Annaka, Tokyo (JP); Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 289 days.

(21) Appl. No.: 16/646,142

(22) PCT Filed: Sep. 19, 2018

(86) PCT No.: PCT/JP2018/034658
§ 371 (c)(1),
(2) Date: Mar. 11, 2020

(87) PCT Pub. No.: WO2019/065416
PCT Pub. Date: Apr. 4, 2019

(65) Prior Publication Data
US 2020/0220138 A1    Jul. 9, 2020

(30) Foreign Application Priority Data
Sep. 28, 2017    (JP) ................. 2017-189127

(51) Int. Cl.
*H01M 4/36* (2006.01)
*H01M 4/62* (2006.01)
*H01M 50/449* (2021.01)
*H01M 50/42* (2021.01)
*H01M 50/443* (2021.01)
*H01M 50/417* (2021.01)

(52) U.S. Cl.
CPC .......... *H01M 4/366* (2013.01); *H01M 4/622* (2013.01); *H01M 50/42* (2021.01); *H01M 50/443* (2021.01); *H01M 50/449* (2021.01); *H01M 50/417* (2021.01)

(58) Field of Classification Search
CPC .... H01M 50/411; H01M 4/366; H01M 4/622; H01M 50/449; H01M 10/052; H01M 50/129; H01M 50/417; H01M 50/443; H01M 50/42; H01M 50/409; H01M 4/13; H01M 4/62; H01M 2300/0025; Y02E 60/10
See application file for complete search history.

(56) References Cited

U.S. PATENT DOCUMENTS

| | | | |
|---|---|---|---|
| 2002/0034686 A1 * | 3/2002 | Yamakawa | H01M 4/621 429/231.95 |
| 2013/0330622 A1 | 12/2013 | Sasaki | |
| 2014/0141314 A1 * | 5/2014 | Kaneda | B05D 1/18 429/144 |
| 2015/0125745 A1 * | 5/2015 | Kaneda | H01M 4/13 429/215 |

FOREIGN PATENT DOCUMENTS

| | | | | |
|---|---|---|---|---|
| JP | 2013145763 A | | 7/2013 | |
| JP | 2014225410 A | * | 12/2014 | ............. H01M 2/16 |
| JP | 2015153638 A | | 8/2015 | |
| JP | 2017103034 A | | 6/2017 | |
| WO | 2012115096 A1 | | 8/2012 | |
| WO | 2013180168 A1 | | 12/2013 | |

OTHER PUBLICATIONS

Machine translation of JP2014225410A, Akiike (Year: 2014).*
Mar. 9, 2021, the Extended European Search Report issued by the European Patent Office in the corresponding European Patent Application No. 18863570.0.
Mar. 31, 2020, International Preliminary Report on Patentability issued in the International Patent Application No. PCT/JP2018/034658.
Nov. 27, 2018, International Search Report issued in the International Patent Application No. PCT/JP2018/034658.

* cited by examiner

*Primary Examiner* — Kwang Han
(74) *Attorney, Agent, or Firm* — Kenja IP Law PC

(57) ABSTRACT

Provided is a composition for a non-aqueous secondary battery functional layer with which it is possible to form a functional layer that has excellent heat shrinkage resistance and can cause a non-aqueous secondary battery to display excellent cycle characteristics. The composition for a non-aqueous secondary battery functional layer contains organic particles and a solvent. The organic particles include a polyfunctional ethylenically unsaturated monomer unit in a proportion of not less than 55 mass % and not more than 90 mass %, and have a volume-average particle diameter of not less than 50 nm and not more than 370 nm.

11 Claims, No Drawings

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

The present disclosure relates to a composition for a non-aqueous secondary battery functional layer, a functional layer for a non-aqueous secondary battery, and a non-aqueous secondary battery.

BACKGROUND

Non-aqueous secondary batteries (hereinafter, also simply referred to as "secondary batteries") such as lithium ion secondary batteries have characteristics such as compact size, light weight, high energy-density, and the ability to be repeatedly charged and discharged, and are used in a wide variety of applications.

A secondary battery generally includes battery components such as electrodes (positive electrode and negative electrode) and a separator that isolates the positive electrode and the negative electrode from one another and prevents short circuiting between the positive and negative electrodes. There are cases in which a porous membrane layer for improving heat resistance and strength, an adhesive layer aimed at improving adhesiveness between battery components, or the like is provided at the surface of an electrode and/or a separator (hereinafter, "functional layer" may be used as a general term for such layers). Specifically, an electrode that includes an electrode substrate obtained by forming an electrode mixed material layer on a current collector and that further includes a functional layer formed on the electrode substrate or a separator that includes a functional layer formed on a separator substrate may be used as a battery component.

Patent Literature (PTL) 1, for example, discloses a method for forming a protective layer that is disposed between a positive electrode and a negative electrode in an electrical accumulator by spraying, onto a substrate, a protective layer-forming composition that contains binder particles, filler particles, and a liquid medium, and in which a ratio of the average particle diameter of the binder particles and the average particle diameter of the filler particles is within a specific range, and then heating the protective layer-forming composition at a temperature within a specific range. According to PTL 1, by forming a protective layer using this method, uneven degradation in the protective layer surface can be inhibited, and charge/discharge characteristics of an electrical accumulator can be enhanced.

CITATION LIST

Patent Literature

PTL 1: JP 2015-153638 A

SUMMARY

Technical Problem

In recent years, there has been demand for even higher secondary battery performance. Specifically, with regards to secondary batteries in which functional layer-containing battery components are used, there is demand for inhibiting functional layer heat shrinkage (i.e., increasing heat shrinkage resistance) so as to sufficiently inhibit short circuiting between positive and negative electrodes in high-temperature environments and further ensure secondary battery safety. There is also demand for further enhancing battery characteristics such as cycle characteristics of secondary batteries.

Accordingly, one objective of the present disclosure is to provide a composition for a non-aqueous secondary battery functional layer with which it is possible to form a functional layer that has excellent heat shrinkage resistance and can cause a non-aqueous secondary battery to display excellent cycle characteristics.

Another objective of the present disclosure is to provide a functional layer that has excellent heat shrinkage resistance and can cause a non-aqueous secondary battery to display excellent cycle characteristics, and also to provide a non-aqueous secondary battery including this functional layer.

Solution to Problem

The inventors conducted diligent investigation with the aim of solving the problems set forth above. The inventors discovered that by using a composition for a functional layer that contains a solvent and organic particles including a polyfunctional ethylenically unsaturated monomer unit in a specific proportion and having a volume-average particle diameter within a specific range, it is possible to inhibit functional layer heat shrinkage while also enhancing secondary battery cycle characteristics, and, in this manner, the inventors completed the present disclosure.

Specifically, the present disclosure aims to advantageously solve the problems set forth above by disclosing a composition for a non-aqueous secondary battery functional layer comprising organic particles and a solvent, wherein the organic particles include a polyfunctional ethylenically unsaturated monomer unit in a proportion of not less than 55 mass% and not more than 90 mass%, and the organic particles have a volume-average particle diameter of not less than 50 nm and not more than 370 nm. By using a composition for a functional layer that contains a solvent and organic particles including a polyfunctional ethylenically unsaturated monomer unit in a proportion within the range set forth above and having a volume-average particle diameter within the range set forth above in this manner, it is possible to form a functional layer having excellent heat shrinkage resistance and to cause a secondary battery to display excellent cycle characteristics through use of a battery component that includes the functional layer.

Note that the phrase "includes a monomer unit" as used with respect to a component formed by a polymer, such as organic particles or a binder, in the present disclosure, means that "a repeating unit derived from the monomer is included in a polymer obtained using the monomer". Moreover, in a polymer that is produced through copolymerization of a plurality of types of monomers, the "fractional content of a monomer unit" formed through polymerization of a given monomer is normally, unless otherwise specified, the same as the ratio (charging ratio) of the given monomer among all monomers used in polymerization of the polymer. Furthermore, the "fractional content" of each "monomer unit" in a polymer can be measured by a nuclear magnetic resonance (NMR) method such as $^1$H-NMR or $^{13}$C-NMR.

Also note that the "volume-average particle diameter" referred to in the present disclosure can be measured by a method described in the EXAMPLES section of the present specification.

In the presently disclosed composition for a non-aqueous secondary battery functional layer, the organic particles preferably have a glass-transition temperature of 100° C. or higher. By using organic particles having a glass-transition temperature of 100° C. or higher in this manner, heat shrinkage resistance of a functional layer can be further improved.

The "glass-transition temperature" referred to in the present disclosure can be measured by a method described in the EXAMPLES section of the present specification.

In the presently disclosed composition for a non-aqueous secondary battery functional layer, the polyfunctional ethylenically unsaturated monomer unit is preferably a polyfunctional (meth)acrylic acid ester monomer unit. By using organic particles including a polyfunctional (meth)acrylic acid ester monomer unit, heat shrinkage resistance of a functional layer can be further improved.

Note that in the present disclosure, "(meth)acryl" is used to indicate "acryl" and/or "methacryl".

In the presently disclosed composition for a non-aqueous secondary battery functional layer, the organic particles preferably further include a monofunctional (meth)acrylic acid ester monomer unit in a proportion of not less than 10 mass % and not more than 45 mass %. When the organic particles include a monofunctional (meth)acrylic acid ester monomer unit in a proportion within the range set forth above, heat shrinkage resistance of a functional layer and cycle characteristics of a secondary battery can be further improved.

The presently disclosed composition for a non-aqueous secondary battery functional layer preferably further comprises a binder, wherein the binder includes a cross-linkable monomer unit in a proportion of not less than 0.05 mass % and not more than 5 mass %. By using a composition for a functional layer that contains a binder including a cross-linkable monomer unit in a proportion within the range set forth above, it is possible to further improve heat shrinkage resistance of a functional layer and cycle characteristics of a secondary battery.

The present disclosure also aims to advantageously solve the problems set forth above by disclosing a functional layer for a non-aqueous secondary battery formed using any one of the compositions for a non-aqueous secondary battery functional layer set forth above. A functional layer that is obtained using any one of the compositions for a functional layer set forth above in this manner has excellent heat shrinkage resistance, and through a battery component that includes the functional layer, it is possible to cause a secondary battery to display excellent cycle characteristics.

The presently disclosed functional layer for a non-aqueous secondary battery preferably has a thickness of not less than 0.5 µm and not more than 1.5 µm. By using a functional layer that has a thickness within the range set forth above, it is possible to further improve heat shrinkage resistance of the functional layer and cycle characteristics of a secondary battery.

The "thickness" of a functional layer referred to in the present disclosure can be measured by a method described in the EXAMPLES section of the present specification.

Moreover, by producing a secondary battery using a battery component that includes the presently disclosed functional layer for a non-aqueous secondary battery, it is possible to ensure adequate safety of the secondary battery while also causing the secondary battery to display excellent cycle characteristics.

Advantageous Effect

According to the present disclosure, it is possible to provide a composition for a non-aqueous secondary battery functional layer with which it is possible to form a functional layer that has excellent heat shrinkage resistance and can cause a non-aqueous secondary battery to display excellent cycle characteristics.

Moreover, according to the present disclosure, it is possible to provide a functional layer that has excellent heat shrinkage resistance and can cause a non-aqueous secondary battery to display excellent cycle characteristics, and also to provide a non-aqueous secondary battery including this functional layer.

DETAILED DESCRIPTION

The following provides a detailed description of embodiments of the present disclosure.

The presently disclosed composition for a non-aqueous secondary battery functional layer can be used as a material in formation of the presently disclosed functional layer for a non-aqueous secondary battery. Moreover, the presently disclosed functional layer for a non-aqueous secondary battery is formed using the presently disclosed composition for a non-aqueous secondary battery functional layer and constitutes part of a separator or an electrode, for example. Furthermore, the presently disclosed non-aqueous secondary battery includes at least the presently disclosed functional layer for a non-aqueous secondary battery.

(Composition for Non-Aqueous Secondary Battery Functional Layer)

The presently disclosed composition for a functional layer is a composition that contains organic particles and a solvent, and that may optionally contain a binder and other components. The organic particles contained in the presently disclosed composition for a functional layer include a polyfunctional ethylenically unsaturated monomer unit in a proportion of not less than 55 mass % and not more than 90 mass %, and have a volume-average particle diameter of not less than 50 nm and not more than 370 nm.

As a result of the presently disclosed composition for a functional layer containing organic particles that include a polyfunctional ethylenically unsaturated monomer unit in a proportion of not less than 55 mass % and not more than 90 mass %, and that have a volume-average particle diameter of not less than 50 nm and not more than 370 nm, a functional layer that is obtained from the composition for a functional layer can be provided with excellent heat shrinkage resistance, and a secondary battery that includes a battery component including the functional layer can be caused to display excellent cycle characteristics.

<Organic Particles>

The organic particles are particles that are formed by a polymer and are a component that can mainly improve heat shrinkage resistance, strength, and so forth of a functional layer.

<<Chemical composition>>

The organic particles include a polyfunctional ethylenically unsaturated monomer unit in a proportion of not less than 55 mass % and not more than 90 mass % as described above, and also include repeating units other than the polyfunctional ethylenically unsaturated monomer unit (other repeating units) in a proportion of not less than 10 mass % and not more than 45 mass %.

[Polyfunctional Ethylenically Unsaturated Monomer Unit]

A monomer that includes two or more ethylenically unsaturated bonds per molecule (however, conjugated diene monomers such as 1,3-butadiene are excluded) is used as a polyfunctional ethylenically unsaturated monomer that can form the polyfunctional ethylenically unsaturated monomer unit referred to in the present disclosure.

Examples of polyfunctional ethylenically unsaturated monomers include:

polyfunctional (meth)acrylic acid ester monomers such as allyl (meth)acrylate, ethylene glycol di(meth)acrylate, diethylene glycol di(meth)acrylate, triethylene glycol di(meth)acrylate, tetraethylene glycol di(meth)acrylate, and trimethylolpropane tri(meth)acrylate;

polyfunctional aromatic vinyl monomers such as divinylbenzene and diisopropenylbenzene;

dipropylene glycol diallyl ether, polyglycol diallyl ether, triethylene glycol divinyl ether, hydroquinone diallyl ether, tetraallyloxyethane, trimethylolpropane diallyl ether, allyl and vinyl ethers of polyfunctional alcohols other than those listed above, triallylamine, and methylenebisacrylamide.

Note that in the present disclosure, "(meth)acrylate" is used to indicate "acrylate" and/or "methacrylate".

One of these polyfunctional ethylenically unsaturated monomers may be used individually, or two or more of these polyfunctional ethylenically unsaturated monomers may be used in combination. Of these polyfunctional ethylenically unsaturated monomers, polyfunctional (meth)acrylic acid ester monomers and polyfunctional aromatic vinyl monomers are preferable, polyfunctional (meth)acrylic acid ester monomers are more preferable, and ethylene glycol dimethacrylate and trimethylolpropane trimethacrylate are even more preferable from a viewpoint of further improving heat shrinkage resistance of a functional layer.

The fractional content of the polyfunctional ethylenically unsaturated monomer unit in the organic particles when all repeating units of the polymer forming the organic particles are taken to be 100 mass % is required to be not less than 55 mass % and not more than 90 mass %, is preferably 64 mass % or more, more preferably 65 mass % or more, and even more preferably 70 mass % or more, and is preferably 85 mass % or less, and more preferably 83 mass % or less. If the proportion constituted by the polyfunctional ethylenically unsaturated monomer unit in the organic particles is less than 55 mass %, heat shrinkage resistance of a functional layer is lost due to reduction of the degree of cross-linking of the organic particles. On the other hand, if the proportion constituted by the polyfunctional ethylenically unsaturated monomer unit in the organic particles is more than 90 mass %, fine particles increase due to reduction of polymerization stability in production of the organic particles, and secondary battery cycle characteristics are lost.

[Other Repeating Units]

Examples of the other repeating units included in the organic particles include, but are not specifically limited to, a monofunctional (meth)acrylic acid ester monomer unit, a nitrile group-containing monomer unit, and an acidic group-containing monomer unit.

Monofunctional (Meth)Acrylic Acid Ester Monomer Unit

Examples of (meth)acrylic acid ester monomers that can form the monofunctional (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

One of these (meth)acrylic acid ester monomers may be used individually, or two or more of these (meth)acrylic acid ester monomers may be used in combination. Of these (meth)acrylic acid ester monomers, methyl acrylate, ethyl acrylate, n-butyl acrylate, 2-ethylhexyl acrylate, methyl methacrylate, ethyl methacrylate, n-butyl methacrylate, and 2-ethylhexyl methacrylate are preferable, and n-butyl acrylate is more preferable.

The fractional content of the monofunctional (meth)acrylic acid ester monomer unit in the organic particles when all repeating units of the polymer forming the organic particles are taken to be 100 mass % is preferably 10 mass % or more, and more preferably 15 mass % or more, and is preferably 45 mass % or less, more preferably 35 mass % or less, and even more preferably 30 mass % or less. When the proportion constituted by the monofunctional (meth)acrylic acid ester monomer unit in the organic particles is 10 mass % or more, production of fine particles can be inhibited by ensuring polymerization stability in production of the organic particles, and secondary battery cycle characteristics can be further improved. On the other hand, when the proportion constituted by the monofunctional (meth)acrylic acid ester monomer unit in the organic particles is 45 mass % or less, the degree of cross-linking of the organic particles can be ensured, and functional layer heat resistance can be further improved. Moreover, secondary battery cycle characteristics can be further enhanced.

Nitrile Group-Containing Monomer Unit

Examples of nitrile group-containing monomers that can form the nitrile group-containing monomer unit include $\alpha,\beta$-ethylenically unsaturated nitrile monomers. Specifically, any $\alpha,\beta$-ethylenically unsaturated compound that has a nitrile group can be used as an $\alpha,\beta$-ethylenically unsaturated nitrile monomer without any specific limitations. Examples include acrylonitrile; $\alpha$-halogenoacrylonitriles such as $\alpha$-chloroacrylonitrile and $\alpha$-bromoacrylonitrile; and $\alpha$-alkylacrylonitriles such as methacrylonitrile and $\alpha$-ethylacrylonitrile. One of these nitrile group-containing monomers may be used individually, or two or more of these nitrile group-containing monomers may be used in combination. Of these nitrile group-containing monomers, acrylonitrile and methacrylonitrile are preferable.

The fractional content of the nitrile group-containing monomer unit in the organic particles when all repeating units of the polymer forming the organic particles are taken to be 100 mass % is preferably 0.1 mass % or more, more preferably 0.5 mass % or more, and even more preferably 1 mass % or more, and is preferably 10 mass % or less, and more preferably 5 mass % or less. When the proportion constituted by the nitrile group-containing monomer unit in the organic particles is not less than 0.1 mass % and not more than 10 mass %, production of fine particles can be inhibited by ensuring polymerization stability in production of the organic particles, and secondary battery cycle characteristics can be further improved.

Acidic Group-Containing Monomer Unit

Examples of acidic group-containing monomers that can form the acidic group-containing monomer unit include carboxy group-containing monomers, sulfo group-containing monomers, and phosphate group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group through hydrolysis can be used as a carboxy group-containing monomer.

Examples of sulfo group-containing monomers include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of these acidic group-containing monomers may be used individually, or two or more of these acidic group-containing monomers may be used in combination. Of these acidic group-containing monomers, carboxy group-containing monomers are preferable, and acrylic acid and methacrylic acid are more preferable.

The fractional content of the acidic group-containing monomer unit in the organic particles when all repeating units of the polymer forming the organic particles are taken to be 100 mass % is preferably 0.1 mass % or more, and more preferably 1 mass % or more, and is preferably 10 mass % or less, and more preferably 5 mass % or less. When the proportion constituted by the acidic group-containing monomer unit in the organic particles is 0.1 mass % or more, production of fine particles can be inhibited by ensuring polymerization stability in production of the organic particles, and secondary battery cycle characteristics can be further improved. On the other hand, when the proportion constituted by the acidic group-containing monomer unit in the organic particles is 10 mass % or less, the amount of water that is imported into a secondary battery can be reduced, and secondary battery cycle characteristics can be enhanced.

<<Production Method>>

The organic particles can be produced through polymerization of a monomer composition containing the monomers described above, carried out in an aqueous solvent such as water, for example. In the polymerization, the fractional content of each monomer in the monomer composition can be set in accordance with the fractional content of each repeating unit (monomer unit) in the organic particles.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. In the polymerization, seed particles may be used to perform seeded polymerization. The polymerization conditions can be adjusted as appropriate depending on the polymerization method and so forth.

Known additives such as emulsifiers, polymerization initiators, and chain transfer agents can be used in the polymerization and the amount thereof may be the same as typically used.

<<Volume-Average Particle Diameter>>

The volume-average particle diameter of the organic particles obtained as described above is required to be not less than 50 nm and not more than 370 nm, is preferably 100 nm or more, more preferably 130 nm or more, and even more preferably 150 nm or more, and is preferably 350 nm or less, and more preferably 300 nm or less. If the volume-average particle diameter of the organic particles is less than 50 nm, functional layer resistance increases, and secondary battery cycle characteristics are lost. On the other hand, if the volume-average particle diameter of the organic particles is more than 370 nm, coating density when the composition for a functional layer is applied onto a substrate to form a functional layer decreases, and heat shrinkage resistance of the obtained functional layer is lost.

Note that the volume-average particle diameter of the organic particles can be adjusted by altering the type and amount of a polymerization initiator, chain transfer agent, and/or emulsifier used in production of the organic particles, for example. In a case in which the organic particles are produced by seeded polymerization, for example, the seed particles can be reduced in size and the volume-average particle diameter of the obtained organic particles can be reduced by increasing the amount of emulsifier used in production of the seed particles, whereas the seed particles can be increased in size and the volume-average particle diameter of the obtained organic particles can be increased by reducing the amount of emulsifier used in production of the seed particles.

<<Glass-Transition Temperature>>

The glass-transition temperature of the organic particles obtained as described above is preferably 100° C. or higher, more preferably 120° C. or higher, and even more preferably 150° C. or higher. When the glass-transition temperature of the organic particles is 100° C. or higher, heat shrinkage resistance of a functional layer can be further improved. Although no specific limitations are placed on the upper limit of the glass-transition temperature of the organic particles, the glass-transition temperature of the organic particles is normally 500° C. or lower.

Note that the glass-transition temperature of the organic particles can be adjusted by altering the types and proportions of monomers used in production of the organic particles, for example.

<Binder>

The presently disclosed composition for a functional layer preferably contains a binder. The binder is a component that is formed by a polymer and that, in a functional layer formed using the composition for a functional layer, can hold components contained in the functional layer, such as the organic particles, so that these components do not become detached from the functional layer.

<<Chemical Composition>>

The binder is preferably formed by a polymer that includes a cross-linkable monomer unit in a proportion of not less than 0.05 mass % and not more than 5 mass %, and that also includes repeating units other than the cross-linkable monomer unit (other repeating units).

[Cross-Linkable Monomer Unit]

Examples of cross-linkable monomers that can form the cross-linkable monomer unit include, without any specific limitations, monomers that can form a cross-linked structure through polymerization. Typical examples of cross-linkable monomers include monomers that are thermally cross-linkable. Specific examples include monomers that include a thermally cross-linkable group and one ethylenically unsaturated bond per molecule; and polyfunctional ethylenically unsaturated monomers (monomers that include two or more ethylenically unsaturated bonds per molecule).

Examples of thermally cross-linkable groups include an epoxy group, an N-methylol amide group, an oxetanyl group, an oxazoline group, and combinations thereof. Of these thermally cross-linkable groups, an epoxy group is more preferable in terms of ease of cross-linking and cross-link density adjustment.

Examples of monomers including an epoxy group as a thermally cross-linkable group and including an ethylenically unsaturated bond include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of monomers including an N-methylol amide group as a thermally cross-linkable group and including an ethylenically unsaturated bond include (meth)acrylamides that include a methylol group such as N-methylol (meth)acrylamide.

Examples of monomers including an oxetanyl group as a thermally cross-linkable group and including an ethylenically unsaturated bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of monomers including an oxazoline group as a thermally cross-linkable group and including an ethylenically unsaturated bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of polyfunctional ethylenically unsaturated monomers (monomers that include two or more ethylenically unsaturated bonds per molecule) include the same "polyfunctional ethylenically unsaturated monomers" as previously described in the "Organic particles" section.

One of these cross-linkable monomers may be used individually, or two or more of these cross-linkable monomers may be used in combination. Of these cross-linkable monomers, allyl methacrylate and allyl glycidyl ether are preferable.

The fractional content of the cross-linkable monomer unit in the binder when all repeating units of the polymer forming the binder are taken to be 100 mass % is preferably 0.05 mass % or more, more preferably 0.1 mass % or more, even more preferably 1 mass % or more, and particularly preferably 2 mass % or more, and is preferably 5 mass % or less, more preferably 3.5 mass % or less, even more preferably 3 mass % or less, and particularly preferably 2.5 mass % or less. When the proportion constituted by the cross-linkable monomer unit in the binder is 0.05 mass % or more, excessive swelling of the binder in electrolyte solution can be inhibited by ensuring the degree of cross-linking of the binder, and secondary battery cycle characteristics can be further improved. On the other hand, when the proportion constituted by the cross-linkable monomer unit in the binder is 5 mass % or less, adhesiveness of a functional layer can be improved by ensuring binding capacity of the binder, and heat shrinkage resistance of the functional layer can be further increased.

[Other Repeating Units]

Examples of the other repeating units included in the polymer forming the binder include, but are not specifically limited to, a monofunctional (meth)acrylic acid ester monomer unit, an aromatic monovinyl monomer unit, and an acidic group-containing monomer unit.

Monofunctional (Meth)Acrylic Acid Ester Monomer Unit

Examples of monofunctional (meth)acrylic acid ester monomers that can form the monofunctional (meth)acrylic acid ester monomer unit include the same monofunctional (meth)acrylic acid ester monomers as previously described in the "Organic particles" section. One of these monofunctional (meth)acrylic acid ester monomers may be used individually, or two or more of these monofunctional (meth)acrylic acid ester monomers may be used in combination. Of these monofunctional (meth)acrylic acid ester monomers, methyl acrylate, ethyl acrylate, n-butyl acrylate, 2-ethylhexyl acrylate, methyl methacrylate, ethyl methacrylate, n-butyl methacrylate, and 2-ethylhexyl methacrylate are preferable, and 2-ethylhexyl acrylate is more preferable.

The fractional content of the monofunctional (meth)acrylic acid ester monomer unit in the binder when all repeating units of the polymer forming the binder are taken to be 100 mass % is preferably 60 mass % or more, and more preferably 65 mass % or more, and is preferably 80 mass % or less, and more preferably 75 mass % or less. When the proportion constituted by the monofunctional (meth)acrylic acid ester monomer unit in the binder is 60 mass % or more, an excessive rise in the glass-transition temperature of the binder can be inhibited, and functional layer adhesiveness can be ensured. On the other hand, when the proportion constituted by the monofunctional (meth)acrylic acid ester monomer unit in the binder is 80 mass % or less, secondary battery cycle characteristics can be further improved.

Aromatic Monovinyl Monomer Unit

Examples of aromatic monovinyl monomers that can form the aromatic monovinyl monomer unit include styrene, styrene sulfonic acid and salts thereof (for example, sodium styrenesulfonate), a-methylstyrene, vinyltoluene, and 4-(tert-butoxy)styrene. One of these aromatic monovinyl monomers may be used individually, or two or more of these aromatic monovinyl monomers may be used in combination. Of these aromatic monovinyl monomers, styrene is preferable.

The fractional content of the aromatic monovinyl monomer unit in the binder when all repeating units of the polymer forming the binder are taken to be 100 mass % is preferably 10 mass % or more, and more preferably 20 mass % or more, and is preferably 40 mass % or less, and more preferably 30 mass % or less. When the proportion constituted by the aromatic monovinyl monomer unit in the binder is 10 mass % or more, the glass-transition temperature of the binder does not excessively fall, and blocking of a battery component that includes a functional layer can be inhibited. On the other hand, when the proportion constituted by the aromatic monovinyl monomer unit in the binder is 40 mass % or less, the glass-transition temperature of the binder does not excessively rise, and functional layer adhesiveness can be ensured.

Acidic Group-Containing Monomer Unit

Examples of acidic group-containing monomers that can form the acidic group-containing monomer unit include the same acidic group-containing monomers as previously described in the "Organic particles" section. One of these acidic group-containing monomers may be used individually, or two or more of these acidic group-containing monomers may be used in combination. Of these acidic group-containing monomers, carboxy group-containing monomers are preferable, and acrylic acid is more preferable.

The fractional content of the acidic group-containing monomer unit in the binder when all repeating units of the polymer forming the binder are taken to be 100 mass % is preferably 2 mass % or more, and more preferably 2.5 mass % or more, and is preferably 8 mass % or less, and more preferably 5 mass % or less. When the proportion constituted by the acidic group-containing monomer unit in the binder is 2 mass % or more, the formation of aggregates can be inhibited because polymer stability is ensured in production of the binder, and secondary battery cycle characteristics can be improved. On the other hand, when the proportion constituted by the acidic group-containing monomer unit in the binder is 8 mass % or less, the amount of water that is imported into a secondary battery can be reduced, and secondary battery cycle characteristics can be enhanced.

<<Production Method>>

The binder can be produced through polymerization of a monomer composition containing the monomers described above, carried out in an aqueous solvent such as water, for example. In the polymerization, the fractional content of each monomer in the monomer composition can be set in accordance with the fractional content of each repeating unit (monomer unit) in the binder.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. The polymerization conditions can be adjusted as appropriate depending on the polymerization method and so forth.

Known additives such as emulsifiers, polymerization initiators, and chain transfer agents can be used in the polymerization and the amount thereof may be the same as typically used.

<<Glass-transition temperature>>

The glass-transition temperature of the binder obtained as described above is preferably −40° C. or higher, and is preferably 0° C. or lower, and more preferably −15° C. or lower. When the glass-transition temperature of the binder is −40° C. or higher, blocking of a battery component that includes a functional layer can be inhibited. On the other hand, when the glass-transition temperature of the binder is 0° C. or lower, sufficient functional layer adhesiveness can be ensured.

Note that the glass-transition temperature of the binder can be adjusted by altering the types and proportions of monomers used in production of the binder, for example. The glass-transition temperature of the binder can be raised by increasing the proportion in which an aromatic monovinyl monomer, such as styrene, is used in production of the binder, for example, and can be lowered by decreasing this proportion, for example.

<<Content Ratio of Organic Particles and Binder>>

Although no specific limitations are placed on the content ratio of the organic particles and the binder in the composition for a functional layer, the proportion constituted by the binder among the total of the organic particles and the binder is preferably 1 mass % or more, more preferably 2 mass % or more, even more preferably 5 mass % or more, and particularly preferably 9 mass % or more, and is preferably 20 mass % or less, and more preferably 15 mass % or less. When the proportion constituted by the binder among the total of the organic particles and the binder is 1 mass % or more, dusting of the organic particles can be inhibited, and sufficient heat shrinkage resistance of a functional layer can be ensured.

<Solvent>

The solvent of the presently disclosed composition for a functional layer can be any known solvent in which the previously described organic particles and the binder that is used as necessary can be dissolved or dispersed. Of such solvents, water is preferable as the solvent of the composition.

<Other Components>

No specific limitations are placed on components other than the organic particles, binder, and solvent that can be contained in the presently disclosed composition for a functional layer. Examples of such components include known inorganic particles and known additives. Inorganic particles described in JP 2017-103034 A, for example, can be used as the known inorganic particles. Moreover, components such as thickeners, surface tension modifiers, dispersants, viscosity modifiers, wetting agents, reinforcing materials, and additives for electrolyte solution can be used without any specific limitations as the known additives. These components are not specifically limited so long as they do not affect battery reactions and may be selected from commonly known components such as those described in WO 2012/115096 A1, for example. Moreover, one of these other components may be used individually, or two or more of these other components may be used in combination in a freely selected ratio.

<Production Method of Composition for Non-Aqueous Secondary Battery Functional Layer>

The presently disclosed composition for a functional layer can, without any specific limitations other than that the specific organic particles described above and a solvent are included, be produced by stirring and mixing the organic particles and the previously described binder and other components that may optionally be added, in the presence of a solvent such as water, for example. Note that in a case in which a dispersion liquid of the organic particles or a dispersion liquid of the binder is used in production of the composition for a functional layer, liquid content of the dispersion liquid may be used as the solvent of the composition for a functional layer.

The solid content concentration of the presently disclosed composition for a functional layer is normally not less than 10 mass % and not more than 40 mass %.

The method of stirring is not specifically limited and may be any known method. Specifically, the composition for a functional layer can be produced in slurry form by mixing the previously described components and the solvent using a typical stirring vessel, ball mill, sand mill, bead mill, pigment disperser, ultrasonic disperser, grinding machine, homogenizer, planetary mixer, FILMIX, or the like. Mixing of the components and solvent can normally be carried out in a temperature range of room temperature to 80° C. for a period of 10 minutes to several hours.

(Functional Layer for Non-Aqueous Secondary Battery)

The presently disclosed functional layer is a layer that is formed from the composition for a functional layer set forth above. The presently disclosed functional layer can be formed by, for example, applying the composition for a functional layer set forth above onto the surface of a suitable substrate to form a coating film, and then drying the coating film that is formed. In other words, the presently disclosed functional layer is formed by a dried product of the composition for a functional layer set forth above, contains the previously described organic particles, and may optionally contain the previously described binder and other components. Note that the organic particles and the binder may be cross-linked during drying of the composition for a functional layer or may be cross-linked during heat treatment or the like that is optionally performed after drying (i.e., the presently disclosed functional layer may contain a cross-linked product of the organic particles, a cross-linked product of the binder, and/or a cross-linked product of the organic particles and the binder). Each component contained in the functional layer is a component that was contained in the composition for a functional layer and the preferred ratio of each component is the same as the preferred ratio of the component in the composition for a functional layer.

As a result of the presently disclosed functional layer being formed using the composition for a functional layer set forth above, the presently disclosed functional layer has excellent heat shrinkage resistance, and a secondary battery can be caused to display excellent cycle characteristics through use of a battery component that includes the functional layer.

<Substrate>

No limitations are placed on the substrate onto which the composition for a functional layer is applied. For example, a coating film of the composition for a functional layer may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a battery component of a secondary battery. Specifically, the functional layer that is peeled from the releasable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery component production efficiency since a step of peeling the functional layer can be omitted.

<<Separator Substrate>>

The separator substrate is not specifically limited and may be a known separator substrate such as an organic separator substrate. The organic separator substrate is a porous member that is made from an organic material. For example, the organic separator substrate may be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof. Although the separator substrate may be of any thickness, the thickness thereof is preferably not less than 5 μm and not more than 30 μm, more preferably not less than 5 μm and not more than 20 μm, and even more preferably not less than 5 μm and not more than 18 μm. A separator substrate thickness of 5 μm or more ensures adequate safety. Moreover, a separator substrate thickness of 30 μm or less can inhibit reduction of ion conductivity, inhibit deterioration of secondary battery output characteristics, inhibit increase of heat shrinkage force of the separator substrate, and increase heat resistance.

<<Electrode Substrate>>

The electrode substrate (positive/negative electrode substrate) is not specifically limited and may, for example, be an electrode substrate obtained by forming an electrode mixed material layer on a current collector.

Note that the current collector, the electrode active material (positive/negative electrode active material) and the binder for an electrode mixed material layer (binder for positive/negative electrode mixed material layer) in the electrode mixed material layer, and the method by which the electrode mixed material layer is formed on the current collector may be known examples thereof such as described in JP 2013-145763 A, for example.

<Formation Method of Functional Layer for Non-Aqueous Secondary Battery>

Examples of methods by which the functional layer may be formed on a substrate such as the separator substrate or electrode substrate described above include:

(1) a method in which the presently disclosed composition for a functional layer is applied onto the surface of a separator substrate or an electrode substrate (surface at the electrode mixed material layer side in the case of an electrode substrate; same applies below) and is then dried;

(2) a method in which a separator substrate or an electrode substrate is immersed in the presently disclosed composition for a functional layer and is then dried; and (3) a method in which the presently disclosed composition for a functional layer is applied onto a releasable substrate and is dried to produce a functional layer that is then transferred onto the surface of a separator substrate or an electrode substrate.

Of these methods, method (1) is particularly preferable since it allows simple control of the thickness of the functional layer. In more detail, method (1) includes a step of applying the composition for a functional layer onto a substrate (application step) and a step of drying the composition for a functional layer that has been applied onto the substrate to form a functional layer (functional layer formation step).

Note that the functional layer may be formed at one side or both sides of a separator substrate or an electrode substrate depending on the structure of the secondary battery that is to be produced. In a case in which a separator substrate is used as the substrate, the functional layer is preferably formed at both sides of the separator substrate, whereas in a case in which an electrode substrate is used as the substrate, the functional layer is preferably formed at one side of the electrode substrate, and particularly on the electrode mixed material layer.

<<Application Step>>

Examples of methods by which the composition for a functional layer can be applied onto the substrate in the application step include, but are not specifically limited to, doctor blading, reverse roll coating, direct roll coating, gravure coating, extrusion coating, and brush coating.

<<Functional Layer Formation Step>>

The method by which the composition for a functional layer on the substrate is dried in the functional layer formation step is not specifically limited and may be a commonly known method. Examples of drying methods that can be used include drying by warm, hot, or low-humidity air, drying in a vacuum, or drying through irradiation with infrared light, electron beams, or the like. Although no specific limitations are placed on the drying conditions, the drying temperature is preferably 40° C. to 150° C., and the drying time is preferably 2 minutes to 30 minutes.

<Thickness of Functional Layer>

The thickness of each functional layer formed on the substrate is preferably 0.5 μm or more, and is preferably 1.5 μm or less, more preferably 1.3 μm or less, and even more preferably 1.1 μm or less. When the thickness of the functional layer is 0.5 μm or more, sufficient heat shrinkage resistance of the functional layer can be ensured. On the other hand, when the thickness of the functional layer is 1.5 μm or less, an excessive increase in resistance of the functional layer can be inhibited, and adequate secondary battery cycle characteristics can be ensured.

<Battery Component Including Functional Layer>

A battery component (separator or electrode) including the presently disclosed functional layer may include constituent elements other than the presently disclosed functional layer set forth above in addition to the separator substrate or electrode substrate and the presently disclosed functional layer so long as the effects disclosed herein are not significantly lost.

(Non-Aqueous Secondary Battery)

The presently disclosed secondary battery includes the presently disclosed functional layer set forth above. More specifically, the presently disclosed secondary battery includes a positive electrode, a negative electrode, a separator, and an electrolyte solution, wherein the functional layer for a non-aqueous secondary battery set forth above is included by at least one battery component among the positive electrode, the negative electrode, and the separator.

<Positive Electrode, Negative Electrode, and Separator>

At least one of the positive electrode, the negative electrode, and the separator used in the presently disclosed secondary battery includes the presently disclosed functional layer. Specifically, an electrode obtained by forming an electrode mixed material layer on a current collector to obtain an electrode substrate and then providing the presently disclosed functional layer on the electrode substrate may be used as a positive electrode or negative electrode that includes the functional layer. Moreover, a separator obtained by providing the presently disclosed functional layer on a separator substrate may be used as a separator that includes the functional layer. The electrode substrate and the separator substrate can be any of the examples previously described in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed non-aqueous secondary battery set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. Note that at least one battery component among the positive electrode, the negative electrode, and the separator is a functional layer-equipped battery component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the volume-average particle diameter and glass-transition temperature of organic particles, the glass-transition temperature of a binder, the thickness and heat shrinkage resistance of a functional layer, and the cycle characteristics of a secondary battery were evaluated by the following methods.

<Volume-Average Particle Diameter of Organic Particles>

A water dispersion of organic particles obtained in each example or comparative example was adjusted to a solid content concentration of 2% to prepare a water dispersion for measurement. The water dispersion for measurement was then used to measure a particle diameter distribution with a laser diffraction/light scattering particle size distribution analyzer (LS230 produced by Beckman Coulter Inc.). In the measured particle diameter distribution, the particle diameter at which cumulative volume calculated from a small-diameter end of the distribution reached 50% was taken to be the volume-average particle diameter (D50) of the organic particles.

<Glass-Transition Temperature (Tg) of Organic Particles and Binder>

Water dispersions of organic particles and water dispersions of binders obtained in the examples and comparative examples were each dried to obtain a measurement sample.

A differential scanning calorimetry (DSC) curve was obtained by weighing 10 mg of the measurement sample into an aluminum pan and then using a differential scanning calorimeter (EXSTAR DSC6220 produced by SII Nano-Technology Inc.) to perform measurement under conditions prescribed by JIS Z 8703 with a measurement temperature range of −100° C. to 200° C. and a heating rate of 10° C./min. Note that an empty aluminum pan was used as a reference. In the heating process, the glass-transition temperature (° C.) was determined as a point of intersection of a baseline directly before a heat absorption peak on the DSC curve at which a derivative signal (DDSC) reached 0.05 mW/min/mg or more and a tangent to the DSC curve at a first inflection point to appear after the heat absorption peak.

<Functional Layer Thickness>

The thickness of a functional layer was calculated by subtracting the thickness of a substrate (separator substrate or electrode substrate) without a functional layer formed thereon from the thickness of a battery component obtained by stacking the functional layer and the substrate. Note that the thicknesses of the battery component and the substrate were each determined by measuring the thickness thereof at 10 arbitrary points using a contact-type thickness meter (Digimatic Indicator Code No. 543-575 produced by Mitutoyo Corporation), and then calculating an average value of the measured thicknesses.

<Heat Shrinkage Resistance Of Functional Layer>

A single-layer polyethylene separator (thickness: 9 μm) produced by a wet method was prepared as a separator substrate. A composition for a functional layer obtained in each example or comparative example was applied onto one side of the separator substrate and was dried on the separator substrate at 50° C. for 10 minutes to form a functional layer (thickness: 1.0 μm). The separator including this functional layer was used as a separator for evaluation.

A square of 12 cm×12 cm was cut out from the produced separator for evaluation, and then a square having a side length of 10 cm was drawn inside the cut-out square to obtain a test specimen. The test specimen was placed in a 130° C. thermostatic tank and was left for 1 hour. Thereafter, the change in area of the square drawn inside the test specimen (={(area of square before being left−area of square after being left)/area of square before being left}×100%) was calculated as the rate of heat shrinkage, and was evaluated by the following standard. A smaller rate of heat shrinkage indicates that the functional layer formed using the composition for a functional layer has better heat shrinkage resistance.

A: Rate of heat shrinkage of less than 2%
B: Rate of heat shrinkage of not less than 2% and less than 3%
C: Rate of heat shrinkage of not less than 3% and less than 5%
D: Rate of heat shrinkage of 5% or more <Secondary Battery Cycle Characteristics>

A lithium ion secondary battery produced in each example or comparative example was left at rest at a temperature of 25° C. for 5 hours after electrolyte solution injection. Next, the lithium ion secondary battery was charged to a cell voltage of 3.65 V by a 0.2 C constant-current method at a temperature of 25° C., and was then subjected to aging at a temperature of 60° C. for 12 hours. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to 3.00 V by a 0.2 C constant-current method.

The lithium ion secondary battery was subsequently subjected to 100 cycles of an operation of charging and discharging between cell voltages of 4.30 V and 3.00 V at a charge/discharge rate of 1.0 C in an environment having a temperature of 25° C. The capacity X1 of the $1^{st}$ cycle (i.e., the initial discharge capacity) and the discharge capacity X2 of the $100^{th}$ cycle were measured. A capacity maintenance rate (%) (=(X2/X1)×100) was calculated and was evaluated by the following standard. A larger value for the capacity maintenance rate indicates that the secondary battery has better cycle characteristics.

A: Capacity maintenance rate of 80% or more
B: Capacity maintenance rate of not less than 70% and less than 80%
C: Capacity maintenance rate of not less than 60% and less than 70%
D: Capacity maintenance rate of less than 60%

Example 1

<Production of Organic Particles>

A reactor A including a stirrer was charged with 0.20 parts of sodium dodecyl sulfate, 0.30 parts of ammonium persulfate, and 180 parts of deionized water. These materials were mixed to obtain a mixture and were heated to 65° C. Meanwhile, a monomer composition for seed particles was produced in a separate vessel by mixing 80.0 parts of n-butyl acrylate as a monofunctional (meth)acrylic acid ester monomer, 10.0 parts of methacrylic acid as an acidic group-containing monomer, 10.0 parts of acrylonitrile as a nitrile group-containing monomer, 0.8 parts of sodium dodecyl sulfate, and 40 parts of deionized water.

The monomer composition for seed particles was continuously added into the reactor A over 4 hours to carry out a polymerization reaction. Note that a temperature of 65° C. was maintained inside the reactor during continuous addition of the monomer composition for seed particles. Once this continuous addition was completed, the polymerization reaction was continued at 80° C. for 3 hours. As a result, a water dispersion of seed particles was obtained. Note that the volume-average particle diameter of the seed particles, measured in the same way as for organic particles, was 120 nm.

Next, a reactor including a stirrer was charged with 20 parts in terms of solid content of the water dispersion of the seed particles (of which, n-butyl acrylate units constituted 16 parts, methacrylic acid units constituted 2 parts, and acrylonitrile units constituted 2 parts), 80 parts of ethylene glycol dimethacrylate (produced by Kyoeisha Chemical Co., Ltd.; product name: LIGHT ESTER EG) as a polyfunctional ethylenically unsaturated monomer, 0.8 parts of sodium dodecylbenzenesulfonate, 3.2 parts of t-butyl peroxy-2-ethylhexanoate (produced by NOF Corporation; product name: PERBUTYL 0) as a polymerization initiator, and 160 parts of deionized water. These materials were stirred at 35° C. for 12 hours such that the polyfunctional ethylenically unsaturated monomer and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion of organic particles. The volume-average particle diameter and the glass-transition temperature of the obtained organic particles were measured. The results are shown in Table 1. Note that in measurement of the glass-transition temperature, a peak was not observed in the measurement temperature range (−100° C. to 200° C.), and the glass-transition temperature of the organic particles was confirmed to be higher than 200° C. (same applies for Examples 2 to 11 and Comparative Examples 1 and 3).

<Production of Binder>

A reactor B including a stirrer was charged with 70 parts of deionized water, 0.20 parts of polyoxyethylene lauryl ether (produced by Kao Corporation; product name: EMULGEN® 120 (EMULGEN is a registered trademark in Japan, other countries, or both)) as an emulsifier, and 0.5 parts of ammonium persulfate. The gas phase was purged with nitrogen gas and the temperature was raised to 60° C. Meanwhile, a monomer composition was obtained in a separate vessel by mixing 50 parts of deionized water, 0.5 parts of polyoxyethylene lauryl ether (produced by Kao Corporation; product name: EMULGEN® 120) as an emulsifier, 70 parts of 2-ethylhexyl acrylate as a monofunctional (meth)acrylic acid ester monomer, 25 parts of styrene as an aromatic monovinyl monomer, 1.7 parts of allyl glycidyl ether and 0.3 parts of allyl methacrylate as cross-linkable monomers, and 3 parts of acrylic acid as an acidic group-containing monomer.

The monomer composition was continuously added into the reactor B over 4 hours to carry out polymerization. The reaction was carried out at 70° C. during the continuous addition. Once this continuous addition was completed, further stirring was performed at 80° C. for 3 hours to complete the reaction and yield a water dispersion of a binder.

The obtained water dispersion of the binder was cooled to 25° C. and was then adjusted to pH 8.0 through addition of sodium hydroxide aqueous solution. Unreacted monomer was subsequently removed through introduction of steam. Thereafter, filtration was performed using a 200-mesh (opening size: approximately 77 μm) stainless steel screen while adjusting the solid content concentration with deionized water so as to obtain a water dispersion (solid content concentration: 40%) of the binder. Note that the volume-average particle diameter of the binder, measured in the same way as for organic particles, was 180 nm.

<Production of Composition For Functional Layer>

A composition for a functional layer (solid content concentration: 20%) was obtained by mixing, in water, the water dispersion of the organic particles obtained as described above, the water dispersion of the binder obtained as described above, carboxymethyl cellulose (produced by Daicel Corporation; product name: DAICEL 1220) as a thickener, and a wetting agent (produced by San Nopco Limited; product name: SN WET 980) such that organic particles:binder:thickener:wetting agent (solid content mass ratio)=82:12:5:1 (proportion constituted by binder among total of organic particles and binder: 13%). The obtained composition for a functional layer was used to produce a separator for evaluation and to evaluate heat shrinkage resistance of a functional layer. The result is shown in Table 1.

<Production of Separator Including Functional Layer at Both Sides>

A single-layer polyethylene separator (thickness: 9 μm) produced by a wet method was prepared as a separator substrate. The composition for a functional layer obtained as described above was applied onto one side of the separator substrate and was dried on the separator substrate at 50° C. for 10 minutes to form a functional layer (thickness: 1.0 μm). The composition for a functional layer obtained as described above was also applied onto the other side of the separator substrate and was dried on the separator substrate at 50° C. for 10 minutes to form a functional layer (thickness: 1.0 μm) and thereby produce a separator including a functional layer at both sides.

<Production pf Positive Electrode>

A slurry composition for a positive electrode was obtained by adding 3 parts (in terms of solid content) of polyvinylidene fluoride (PVDF; produced by Kureha Corporation; product name: KF-1100) as a binder for a positive electrode to 95 parts of $LiCoO_2$ as a positive electrode active material, further adding 2 parts of acetylene black as a conductive material and 20 parts of N-methylpyrrolidone as a solvent, and mixing these materials in a planetary mixer. The slurry composition for a positive electrode was applied onto one side of aluminum foil of 18 μm in thickness and was dried at 120° C. for 3 hours. Thereafter, rolling was performed by roll pressing to obtain a positive electrode (thickness: 100 μm) including a positive electrode mixed material layer.

<Production of Negative Electrode>

A slurry composition for a negative electrode was obtained by mixing 98 parts of graphite (particle diameter: 20 μm; specific surface area: 4.2 m²/g) as a negative electrode active material and 1 part (in terms of solid content) of styrene-butadiene rubber (SBR; glass-transition temperature: −10° C.) as a binder for a negative electrode, adding 1.0 parts of carboxymethyl cellulose to the resultant mixture, and mixing these materials in a planetary mixer. The slurry composition for a negative electrode was applied onto one side of copper foil of 18 μm in thickness and was dried at 120° C. for 3 hours. Thereafter, rolling was performed by roll pressing to obtain a negative electrode (thickness: 100 μm) including a negative electrode mixed material layer.

<Production of Secondary Battery>

The positive electrode obtained as described above was cut out as 49 cm×5 cm and was placed on a stage with the surface at the positive electrode mixed material layer side thereof facing upward. The separator obtained as described above (separator including a functional layer at both sides) was cut out as 120 cm×5.5 cm and was arranged on the positive electrode mixed material layer of the positive electrode such that the positive electrode was positioned at a longitudinal direction left-hand side of the separator. In addition, the negative electrode obtained as described above was cut out as 50 cm×5.2 cm and was arranged on the separator such that the surface at the negative electrode mixed material layer side thereof was in contact with the separator and the negative electrode was positioned at a longitudinal direction right-hand side of the separator. In this manner, a laminate was obtained. The laminate was wound using a winding machine with the middle of the separator in the longitudinal direction at the center so as to obtain a roll. The roll was enclosed in an aluminum packing case serving as a battery case, and electrolyte solution (solvent: ethylene carbonate/ethyl methyl carbonate/vinylene carbonate (volume mixing ratio)=30.0/70.0/1.5; electrolyte: $LiPF_6$ of 1 M in concentration) was injected such that no air remained. The aluminum packing case was closed and sealed by heat sealing at 150° C. to produce a wound-type lithium ion secondary battery. Cycle characteristics of the obtained lithium ion secondary battery were evaluated. The result is shown in Table 1.

Example 2

Organic particles, a binder, a composition for a functional layer, a separator, a negative electrode, a positive electrode, and a secondary battery were produced in the same way as in Example 1 with the exception that trimethylolpropane trimethacrylate was used instead of ethylene glycol dimethacrylate in production of the organic particles. Each evaluation was also performed in the same way as in Example 1. The results are shown in Table 1.

Example 3

Organic particles, a binder, a composition for a functional layer, a separator, a negative electrode, a positive electrode, and a secondary battery were produced in the same way as in Example 1 with the exception that in production of the organic particles, seed particles were produced using a monomer composition for seed particles in which the amount of n-butyl acrylate was changed to 84.6 parts, the amount of methacrylic acid was changed to 7.7 parts, and the amount of acrylonitrile was changed to 7.7 parts, and, in seeded polymerization, the amount of the seed particles in terms of solid content was changed to 13 parts (of which, n-butyl acrylate units constituted 11 parts, methacrylic acid units constituted 1 part, and acrylonitrile units constituted 1 part) and the amount of ethylene glycol dimethacrylate was changed to 87 parts. Each evaluation was also performed in the same way as in Example 1. The results are shown in Table 1.

Example 4

Organic particles, a binder, a composition for a functional layer, a separator, a negative electrode, a positive electrode, and a secondary battery were produced in the same way as in Example 1 with the exception that in production of the organic particles, seed particles were produced using a monomer composition for seed particles in which the amount of n-butyl acrylate was changed to 83.4 parts, the amount of methacrylic acid was changed to 8.3 parts, and the amount of acrylonitrile was changed to 8.3 parts, and, in seeded polymerization, the amount of the seed particles in terms of solid content was changed to 36 parts (of which, n-butyl acrylate units constituted 30 parts, methacrylic acid units constituted 3 parts, and acrylonitrile units constituted 3 parts) and the amount of ethylene glycol dimethacrylate was changed to 64 parts. Each evaluation was also performed in the same way as in Example 1. The results are shown in Table 1.

Examples 5 and 6

Organic particles, a binder, a composition for a functional layer, a separator, a negative electrode, a positive electrode, and a secondary battery were produced in the same way as in Example 1 with the exception that in production of the organic particles, the amount of sodium dodecyl sulfate that was charged to the reactor A including a stirrer was changed from 0.20 parts to 0.10 parts (Example 5) or 0.40 parts (Example 6), and the volume-average particle diameter of the seed particles was adjusted to 250 nm (Example 5) or 70 nm (Example 6). Each evaluation was also performed in the same way as in Example 1. The results are shown in Table 1.

Example 7

Organic particles, a binder, a composition for a functional layer, a separator, a negative electrode, a positive electrode, and a secondary battery were produced in the same way as in Example 1 with the exception that in production of the organic particles, seed particles were produced using a monomer composition for seed particles in which the amount of n-butyl acrylate was changed to 91.4 parts, the amount of methacrylic acid was changed to 4.3 parts, and the amount of acrylonitrile was changed to 4.3 parts, and, in seeded polymerization, the amount of the seed particles in terms of solid content was changed to 35 parts (of which, n-butyl acrylate units constituted 32 parts, methacrylic acid units constituted 1.5 parts, and acrylonitrile units constituted 1.5 parts) and the amount of ethylene glycol dimethacrylate was changed to 65 parts. Each evaluation was also performed in the same way as in Example 1. The results are shown in Table 1.

Example 8

Organic particles, a binder, a composition for a functional layer, a separator, a negative electrode, a positive electrode, and a secondary battery were produced in the same way as in Example 1 with the exception that in production of the organic particles, seed particles were produced using a monomer composition for seed particles in which the amount of n-butyl acrylate was changed to 75.0 parts, the amount of methacrylic acid was changed to 12.5 parts, and the amount of acrylonitrile was changed to 12.5 parts, and, in seeded polymerization, the amount of the seed particles in terms of solid content was changed to 16 parts (of which, n-butyl acrylate units constituted 12 parts, methacrylic acid units constituted 2 parts, and acrylonitrile units constituted 2 parts) and the amount of ethylene glycol dimethacrylate was changed to 84 parts. Each evaluation was also performed in the same way as in Example 1. The results are shown in Table 1.

Example 9

Organic particles, a binder, a composition for a functional layer, a separator, a negative electrode, a positive electrode, and a secondary battery were produced in the same way as in Example 1 with the exception that in production of the binder, the amount of allyl methacrylate in the monomer composition was changed to 1.3 parts and the amount of acrylic acid in the monomer composition was changed to 2 parts. Each evaluation was also performed in the same way as in Example 1. The results are shown in Table 1.

Example 10

<Production of Organic Particles, Binder, and Composition for Functional Layer>

Organic particles, a binder, and a composition for a functional layer were produced in the same way as in Example 1. Each evaluation was also performed in the same way as in Example 1. The results are shown in Table 1.

<Preparation of Separator>

A single-layer polyethylene separator (thickness: 9 μm) produced by a wet method was prepared as a separator.

<Production of Positive Electrode Including Functional Layer>

A slurry composition for a positive electrode was obtained by adding 3 parts (in terms of solid content) of polyvinylidene fluoride (PVDF; produced by Kureha Corporation; product name: KF-1100) as a binder for a positive electrode to 95 parts of $LiCoO_2$ as a positive electrode active material, further adding 2 parts of acetylene black as a conductive material and 30 parts of N-methylpyrrolidone as a solvent, and mixing these materials in a planetary mixer. The slurry composition for a positive electrode was applied onto one side of aluminum foil of 18 μm in thickness and was dried at 120° C. for 3 hours. Thereafter, rolling was performed by roll pressing to obtain a positive electrode substrate (thickness: 100 μm) including a positive electrode mixed material layer.

The composition for a functional layer obtained as described above was applied onto the surface at the positive electrode mixed material layer side of the positive electrode substrate and was dried on the positive electrode substrate at 50° C. for 10 minutes to form a functional layer (thickness: 1.0 μm) and thereby obtain a positive electrode including the functional layer.

<Production of Negative Electrode>

A negative electrode was produced in the same way as in Example 1.

<Production of Secondary Battery>

The positive electrode obtained as described above (positive electrode including a functional layer on a positive electrode mixed material layer) was cut out as 49 cm×5 cm and was placed on a stage with the surface at the functional layer side thereof facing upward. The separator obtained as described above was cut out as 120 cm×5.5 cm and was arranged on the functional layer of the positive electrode such that the positive electrode was positioned at a longitudinal direction left-hand side of the separator. In addition, the negative electrode obtained as described above was cut out as 50 cm×5.2 cm and was arranged on the separator such that the surface at the negative electrode mixed material layer side thereof was in contact with the separator and the negative electrode was positioned at a longitudinal direction right-hand side of the separator. In this manner, a laminate was obtained. The laminate was wound using a winding machine with the middle of the separator in the longitudinal direction at the center so as to obtain a roll. The roll was enclosed in an aluminum packing case serving as a battery case, and electrolyte solution (solvent: ethylene carbonate/ethyl methyl carbonate/vinylene carbonate (volume mixing ratio) =30.0/70.0/1.5; electrolyte: $LiPF_6$ of 1 M in concentration) was injected such that no air remained. The aluminum packing case was closed and sealed by heat sealing at 150° C. to produce a wound-type lithium ion secondary battery. Cycle characteristics of the obtained lithium ion secondary battery were evaluated. The result is shown in Table 1.

Example 11

Organic particles, a binder, a composition for a functional layer, a separator, a negative electrode, a positive electrode, and a secondary battery were produced in the same way as in Example 1 with the exception that in production of the separator including a functional layer at both sides, the thickness of each functional layer was changed to 1.3 μm. Each evaluation was also performed in the same way as in Example 1. The results are shown in Table 1.

Comparative Example 1

Organic particles, a binder, a composition for a functional layer, a separator, a negative electrode, a positive electrode, and a secondary battery were produced in the same way as in Example 1 with the exception that in production of the organic particles, seed particles were produced using a monomer composition for seed particles in which the amount of n-butyl acrylate was changed to 75.0 parts, the amount of methacrylic acid was changed to 6.25 parts, and the amount of acrylonitrile was changed to 18.75 parts, and, in seeded polymerization, the amount of the seed particles in terms of solid content was changed to 8 parts (of which, n-butyl acrylate units constituted 6 parts, methacrylic acid units constituted 0.5 parts, and acrylonitrile units constituted 1.5 parts) and the amount of ethylene glycol dimethacrylate was changed to 92 parts. Each evaluation was also performed in the same way as in Example 1. The results are shown in Table 1.

Comparative Example 2

Organic particles, a binder, a composition for a functional layer, a separator, a negative electrode, a positive electrode, and a secondary battery were produced in the same way as in Example 1 with the exception that in production of the organic particles, seed particles were produced using a monomer composition for seed particles in which the amount of n-butyl acrylate was changed to 95.2 parts, the amount of methacrylic acid was changed to 1.0 parts, and the amount of acrylonitrile was changed to 3.8 parts, and, in seeded polymerization, the amount of the seed particles in terms of solid content was changed to 52 parts (of which, n-butyl acrylate units constituted 49.5 parts, methacrylic acid units constituted 0.5 parts, and acrylonitrile units constituted 2 parts) and the amount of ethylene glycol dimethacrylate was changed to 48 parts. Each evaluation was also performed in the same way as in Example 1. The results are shown in Table 1.

Comparative Example 3

Organic particles, a binder, a composition for a functional layer, a separator, a negative electrode, a positive electrode, and a secondary battery were produced in the same way as in Example 1 with the exception that the amount of sodium dodecyl sulfate that was charged to the reactor A including a stirrer in production of the organic particles was changed from 0.20 parts to 0 parts (i.e., sodium dodecyl sulfate was not used). Each evaluation was also performed in the same way as in Example 1. The results are shown in Table 1.

In Table 1, shown below:
"EDMA" indicates ethylene glycol dimethacrylate unit;
"TMPTMA" indicates trimethylolpropane trimethacrylate unit;
"BA" indicates n-butyl acrylate unit;
"AN" indicates acrylonitrile unit;
"MAA" indicates methacrylic acid unit;
"AMA" indicates allyl methacrylate unit;
"AGE" indicates allyl glycidyl ether unit;
"2EHA" indicates 2-ethylhexyl acrylate unit;
"ST" indicates styrene unit; and
"AA" indicates acrylic acid unit.

TABLE 1

| | | | | | Example 1 | Example 2 | Example 3 | Example 4 |
|---|---|---|---|---|---|---|---|---|
| Battery component including functional layer | | | | | Separator | Separator | Separator | Separator |
| Composition for functional layer | Organic particles | Chemical composition | Polyfunctional ethylenically unsaturated monomer unit | Type | EDMA | TMPTMA | EDMA | EDMA |
| | | | | Fractional content [mass %] | 80 | 80 | 87 | 64 |
| | | | Monofunctional (meth)acrylic acid ester monomer unit | Type | BA | BA | BA | BA |
| | | | | Fractional content [mass %] | 16 | 16 | 11 | 30 |
| | | | Nitrile group-containing monomer unit | Type | AN | AN | AN | AN |
| | | | | Fractional content [mass %] | 2 | 2 | 1 | 3 |
| | | | Acidic group-containing monomer unit | Type | MAA | MAA | MAA | MAA |
| | | | | Fractional content [mass %] | 2 | 2 | 1 | 3 |
| | | Volume-average particle diameter [nm] | | | 200 | 200 | 200 | 200 |
| | | Tg [° C.] | | | >200 | >200 | >200 | >200 |
| | Binder | Chemical composition | Cross-linkable monomer unit | Type | AMA | AMA | AMA | AMA |
| | | | | Fractional content [mass %] | 0.3 | 0.3 | 0.3 | 0.3 |
| | | | | Type | AGE | AGE | AGE | AGE |
| | | | | Fractional content [mass %] | 1.7 | 1.7 | 1.7 | 1.7 |
| | | | Monofunctional (meth)acrylic acid ester monomer unit | Type | 2EHA | 2EHA | 2EHA | 2EHA |
| | | | | Fractional content [mass %] | 70 | 70 | 70 | 70 |
| | | | Aromatic mono vinyl monomer unit | Type | ST | ST | ST | ST |
| | | | | Fractional content [mass %] | 25 | 25 | 25 | 25 |
| | | | Acidic group-containing monomer unit | Type | AA | AA | AA | AA |
| | | | | Fractional content [mass %] | 3 | 3 | 3 | 3 |
| | | Tg [° C.] | | | −30 | −30 | −30 | −30 |
| | | Proportion constituted by binder among organic particles + binder [mass %] | | | 13 | 13 | 13 | 13 |
| Functional layer thickness [μm] | | | | | 1 | 1 | 1 | 1 |
| Heat shrinkage resistance | | | | | A | A | A | B |
| Cycle characteristics | | | | | A | A | B | A |

| | | | | | Example 5 | Example 6 | Example 7 | Example 8 |
|---|---|---|---|---|---|---|---|---|
| Battery component including functional layer | | | | | Separator | Separator | Separator | Separator |
| Composition for functional layer | Organic particles | Chemical composition | Polyfunctional ethylenically unsaturated monomer unit | Type | EDMA | EDMA | EDMA | EDMA |
| | | | | Fractional content [mass %] | 80 | 80 | 65 | 84 |
| | | | Monofunctional (meth)acrylic acid ester monomer unit | Type | BA | BA | BA | BA |
| | | | | Fractional content [mass %] | 16 | 16 | 32 | 12 |
| | | | Nitrile group-containing monomer unit | Type | AN | AN | AN | AN |
| | | | | Fractional content [mass %] | 2 | 2 | 1.5 | 2 |
| | | | Acidic group-containing monomer unit | Type | MAA | MAA | MAA | MAA |
| | | | | Fractional content [mass %] | 2 | 2 | 1.5 | 2 |
| | | Volume-average particle diameter [nm] | | | 350 | 130 | 200 | 200 |
| | | Tg [° C.] | | | >200 | >200 | >200 | >200 |
| | Binder | Chemical composition | Cross-linkable monomer unit | Type | AMA | AMA | AMA | AMA |
| | | | | Fractional content [mass %] | 0.3 | 0.3 | 0.3 | 0.3 |
| | | | | Type | AGE | AGE | AGE | AGE |
| | | | | Fractional content [mass %] | 1.7 | 1.7 | 1.7 | 1.7 |

TABLE 1-continued

|  |  |  |  |  |  |  |  |  |
|---|---|---|---|---|---|---|---|---|
|  |  |  | Monofunctional (meth)acrylic acid ester monomer unit | Type | 2EHA | 2EHA | 2EHA | 2EHA |
|  |  |  |  | Fractional content [mass %] | 70 | 70 | 70 | 70 |
|  |  |  | Aromatic mono vinyl monomer unit | Type | ST | ST | ST | ST |
|  |  |  |  | Fractional content [mass %] | 25 | 25 | 25 | 25 |
|  |  |  | Acidic group-containing monomer unit | Type | AA | AA | AA | AA |
|  |  |  |  | Fractional content [mass %] | 3 | 3 | 3 | 3 |
|  |  | Tg [° C.] |  |  | −30 | −30 | −30 | −30 |
|  |  | Proportion constituted by binder among organic particles + binder [mass %] |  |  | 13 | 13 | 13 | 13 |
| Functional layer thickness [μm] |  |  |  |  | 1 | 1 | 1 | 1 |
| Heat shrinkage resistance |  |  |  |  | B | A | B | A |
| Cycle characteristics |  |  |  |  | A | B | B | B |

|  |  |  |  |  | Example 9 | Example 10 | Example 11 | Comparative Example 1 | Comparative Example 2 | Comparative Example 3 |
|---|---|---|---|---|---|---|---|---|---|---|
| Battery component including functional layer |  |  |  |  | Separator | Positive electrode | Separator | Separator | Separator | Separator |
| Composition for functional layer | Organic particles | Chemical composition | Polyfunctional ethylenically unsaturated monomer unit | Type | EDMA | EDMA | EDMA | EDMA | EDMA | EDMA |
|  |  |  |  | Fractional content [mass %] | 80 | 80 | 80 | 92 | 48 | 80 |
|  |  |  | Monofunctional (meth)acrylic acid ester monomer unit | Type | BA | BA | BA | BA | BA | BA |
|  |  |  |  | Fractional content [mass %] | 16 | 16 | 16 | 6 | 49.5 | 16 |
|  |  |  | Nitrile group-containing monomer unit | Type | AN | AN | AN | AN | AN | AN |
|  |  |  |  | Fractional content [mass %] | 2 | 2 | 2 | 1.5 | 2 | 2 |
|  |  |  | Acidic group-containing monomer unit | Type | MAA | MAA | MAA | MAA | MAA | MAA |
|  |  |  |  | Fractional content [mass %] | 2 | 2 | 2 | 0.5 | 0.5 | 2 |
|  |  | Volume-average particle diameter [nm] |  |  | 200 | 200 | 200 | 200 | 200 | 500 |
|  |  | Tg [° C.] |  |  | >200 | >200 | >200 | >200 | 80 | >200 |
|  | Binder | Chemical composition | Crosslinkable monomer unit | Type | AMA | AMA | AMA | AMA | AMA | AMA |
|  |  |  |  | Fractional content [mass %] | 1.3 | 0.3 | 0.3 | 0.3 | 0.3 | 0.3 |
|  |  |  |  | Type | AGE | AGE | AGE | AGE | AGE | AGE |
|  |  |  |  | Fractional content [mass %] | 1.7 | 1.7 | 1.7 | 1.7 | 1.7 | 1.7 |
|  |  |  | Monofunctional (meth)acrylic acid ester monomer unit | Type | 2EHA | 2EHA | 2EHA | 2EHA | 2EHA | 2EHA |
|  |  |  |  | Fractional content [mass %] | 70 | 70 | 70 | 70 | 70 | 70 |
|  |  |  | Aromatic mono vinyl monomer unit | Type | ST | ST | ST | ST | ST | ST |
|  |  |  |  | Fractional content [mass %] | 25 | 25 | 25 | 25 | 25 | 25 |
|  |  |  | Acidic group-containing monomer unit | Type | AA | AA | AA | AA | AA | AA |
|  |  |  |  | Fractional content [mass %] | 2 | 3 | 3 | 3 | 3 | 3 |
|  |  | Tg [° C.] |  |  | −30 | −30 | −30 | −30 | −30 | −30 |
|  |  | Proportion constituted by binder among organic particles + binder [mass %] |  |  | 13 | 13 | 13 | 13 | 13 | 13 |
| Functional layer thickness [μm] |  |  |  |  | 1 | 1 | 1.3 | 1 | 1 | 1 |
| Heat shrinkage resistance |  |  |  |  | B | A | A | A | D | D |
| Cycle characteristics |  |  |  |  | A | A | B | D | C | A |

It can be seen from Table 1 that in Examples 1 to 11 in which the used composition for a functional layer contained, in a solvent, organic particles that were formed by a polymer including a polyfunctional ethylenically unsaturated monomer unit in a proportion of not less than 55 mass % and not more than 90 mass % and that had a volume-average particle diameter of not less than 50 nm and not more than 370 nm, it was possible to form a functional layer having excellent heat shrinkage resistance and to cause a secondary battery to display excellent cycle characteristics using a battery component (separator or electrode) including the functional layer.

In contrast, it can be seen that secondary battery cycle characteristics deteriorated in Comparative Example 1 in which the used composition for a functional layer contained organic particles formed by a polymer in which the fractional content of a polyfunctional ethylenically unsaturated monomer unit was more than 90 mass %.

Moreover, it can be seen that functional layer heat shrinkage resistance decreased in Comparative Example 2 in which the used composition for a functional layer contained organic particles formed by a polymer in which the fractional content of a polyfunctional ethylenically unsaturated monomer unit was less than 55 mass %.

Furthermore, it can be seen that functional layer heat shrinkage resistance decreased in Comparative Example 3 in which the used composition for a functional layer contained organic particles having a volume-average particle diameter of more than 370 nm.

INDUSTRIAL APPLICABILITY

According to the present disclosure, it is possible to provide a composition for a non-aqueous secondary battery functional layer with which it is possible to form a functional layer that has excellent heat shrinkage resistance and can cause a non-aqueous secondary battery to display excellent cycle characteristics.

Moreover, according to the present disclosure, it is possible to provide a functional layer that has excellent heat shrinkage resistance and can cause a non-aqueous secondary battery to display excellent cycle characteristics, and also to provide a non-aqueous secondary battery including this functional layer.

The invention claimed is:

1. A composition for a non-aqueous secondary battery functional layer comprising organic particles and a solvent, wherein the organic particles include a polyfunctional ethylenically unsaturated monomer unit in a proportion of not less than 55 mass % and not more than 90 mass %, and a carboxy group-containing monomer unit in a proportion of not less than 1 mass % and not more than 10 mass %, and the organic particles have a volume-average particle diameter of not less than 50 nm and not more than 370 nm.

2. The composition for a non-aqueous secondary battery functional layer according to claim 1, wherein the organic particles have a glass-transition temperature of 100° C. or higher.

3. The composition for a non-aqueous secondary battery functional layer according to claim 1, wherein the polyfunctional ethylenically unsaturated monomer unit is a polyfunctional (meth)acrylic acid ester monomer unit.

4. The composition for a non-aqueous secondary battery functional layer according to claim 1, wherein the organic particles further include a monofunctional (meth)acrylic acid ester monomer unit in a proportion of not less than 10 mass % and not more than 45 mass %.

5. The composition for a non-aqueous secondary battery functional layer according to claim 1, further comprising a binder, wherein the binder includes a cross-linkable monomer unit in a proportion of not less than 0.05 mass % and not more than 5 mass %.

6. A functional layer for a non-aqueous secondary battery formed using the composition for a non-aqueous secondary battery functional layer according to claim 1.

7. The functional layer for a non-aqueous secondary battery according to claim 6, having a thickness of not less than 0.5 μm and not more than 1.5 μm.

8. A non-aqueous secondary battery comprising the functional layer for a non-aqueous secondary battery according to claim 6.

9. The composition for a non-aqueous secondary battery functional layer according to claim 1, wherein the organic particles include a nitrile group-containing monomer unit.

10. The composition for a non-aqueous secondary battery functional layer according to claim 1, wherein the carboxy group-containing monomer unit is at least one selected from the group consisting of acrylic acid unit and methacrylic acid unit.

11. The composition for a non-aqueous secondary battery functional layer according to claim 1, wherein the carboxy group-containing monomer unit is methacrylic acid unit.

* * * * *